United States Patent
Khan et al.

(10) Patent No.: US 7,827,816 B2
(45) Date of Patent: Nov. 9, 2010

(54) FRONT COVER FOR TRANSPORT REFRIGERATION UNIT

(75) Inventors: Shafi N. Khan, Cicero, NY (US); Thomas S. Visalli, Oneida, NY (US)

(73) Assignee: Carrier Corporation, Farmington, CT (US)

(*) Notice: Subject to any disclaimer, the term of this patent is extended or adjusted under 35 U.S.C. 154(b) by 72 days.

(21) Appl. No.: 12/298,954

(22) PCT Filed: May 9, 2006

(86) PCT No.: PCT/US2006/018012
§ 371 (c)(1),
(2), (4) Date: Oct. 29, 2008

(87) PCT Pub. No.: WO2007/130065
PCT Pub. Date: Nov. 15, 2007

(65) Prior Publication Data
US 2009/0126384 A1  May 21, 2009

(51) Int. Cl.
*B60H 1/32* (2006.01)
(52) U.S. Cl. .......... 62/239; 62/508; 454/277; 454/309
(58) Field of Classification Search .......... 62/239, 62/508; 454/275–277, 309, 221, 224, 299, 454/289, 292, 358
See application file for complete search history.

(56) References Cited

U.S. PATENT DOCUMENTS

| 701,228 A | 5/1902 | Smith |
| 3,530,781 A | 9/1970 | Kesinger |
| 4,434,710 A | 3/1984 | Bolton et al. |
| 4,665,806 A | 5/1987 | Martin, Sr. |
| 5,297,004 A | 3/1994 | Mazura |
| 5,388,424 A | 2/1995 | Chopko et al. |
| 5,716,270 A | 2/1998 | Chambers |
| 5,971,505 A | 10/1999 | Zamora |
| 6,279,339 B1 | 8/2001 | Correa et al. |

OTHER PUBLICATIONS

Notification of Transmittal of International Preliminary Report on Patentability, Mailed Apr. 12, 2010, 7 pgs.

*Primary Examiner*—William E Tapolcai
(74) *Attorney, Agent, or Firm*—Marjama Muldoon Blasiak & Sullivan LLP

(57) ABSTRACT

A transport refrigeration unit has a front cover that includes a grille supported by and attached to a surround assembly by means of latch members.

5 Claims, 4 Drawing Sheets

FRONT COVER FOR TRANSPORT REFRIGERATION UNIT

FIELD OF THE INVENTION

The present invention relates generally to the art of transport refrigeration units and, more particularly, to a grille and surround assembly for the outer protective covers for such units.

A typical transport refrigeration unit of the type designed for mounting on the front face of a tractor trailer unit comprises a one piece, self-contained fully refrigerant charged, prewired, refrigerant/heating unit powered by a diesel engine. In such a design the evaporator section fits into a rectangular opening in the upper portion of the trailer front wall. When installed, the evaporator section is located inside the trailer; and the condensing section is outside and on the front of the trailer. The condensing section consists of an engine-compressor drive package, condenser fan, condenser coil, radiator coil, control panel, relay module, refrigerant controls, piping, wiring and associated components.

Structural frame members support all of the components and facilitate attaching of the unit to the trailer front face. Also supported by the structural framework is an outer cover which includes the necessary air inlet and outlet openings for air cooling of the condenser coil, and doors which may be opened to provide access to the interior of the unit for maintenance and service.

The air inlet for cooling of the condenser coil is provided by way of a grille located at the upper, front face of the cover. Typically, the grille is composed of a durable rigid plastic material, such as for example acrylonitrile butadiene styrene (ABS) material or polyethylene or polyolefin material, and is mounted to a surrounding support structure, commonly referred to as a surround assembly, that is mounted to the framework of the refrigeration unit. In conventional practice, the grille is mounted to the surround assembly by means of a plurality of threaded fasteners arranged in spaced relationship about the periphery of the grille.

SUMMARY OF THE INVENTION

It is an object of an aspect of the invention to provide an improved method for attaching a front grille to a supporting surround assembly.

It is an object of an aspect of the invention to provide a transport refrigeration unit having a front cover that includes a grille attached to a supporting surround assembly by compliant latch members.

In one aspect of the invention, a transport refrigeration unit of the type adapted to be mounted on the front wall of a trailer for conditioning the environment interior of the trailer has a front cover for enclosing the refrigeration unit, including a grille that is supported from a surrounding structure by compliant latching members. The support structure has a center opening defined by a plurality of peripheral sides and adapted to receive the grille. The grille has a plurality of latch members extending rearward from its periphery and the support structure has a plurality of openings in its peripheral sides about the center opening for receiving the latch members in latching relationship whereby the grille is supported by the support structure.

The latch members may be disposed at spaced intervals about the periphery of the grille and the plurality of openings in the peripheral sides of the support structure are commensurate in number to the plurality of the latch members and arranged in mating relationship to the plurality of latch members. In an embodiment, each of the latch members is a leg extending rearward from a proximal end integral with the grille to a distal end extending through a respective one of the plurality of openings in the peripheral sides of the support structure. Each leg has a foot at its distal end that extends outwardly therefrom so as to engage the support structure in latching relationship.

In an aspect of the invention, a method is provided for attaching the grille of the front cover of a transport refrigeration unit to a surrounding support structure with latch members. In an embodiment, the method includes the steps of providing a plurality of latch members extending rearward from a periphery of the grille, and providing a plurality of openings in the support structure about the periphery of a center opening in the support structure for receiving the latch members in latching relationship.

BRIEF DESCRIPTION OF THE DRAWINGS

For a further understanding of the invention, reference will be made to the following detailed description of the exemplary embodiment depicted in the accompanying drawing, where.

DETAILED DESCRIPTION OF THE PREFERRED EMBODIMENT

Figure 1:
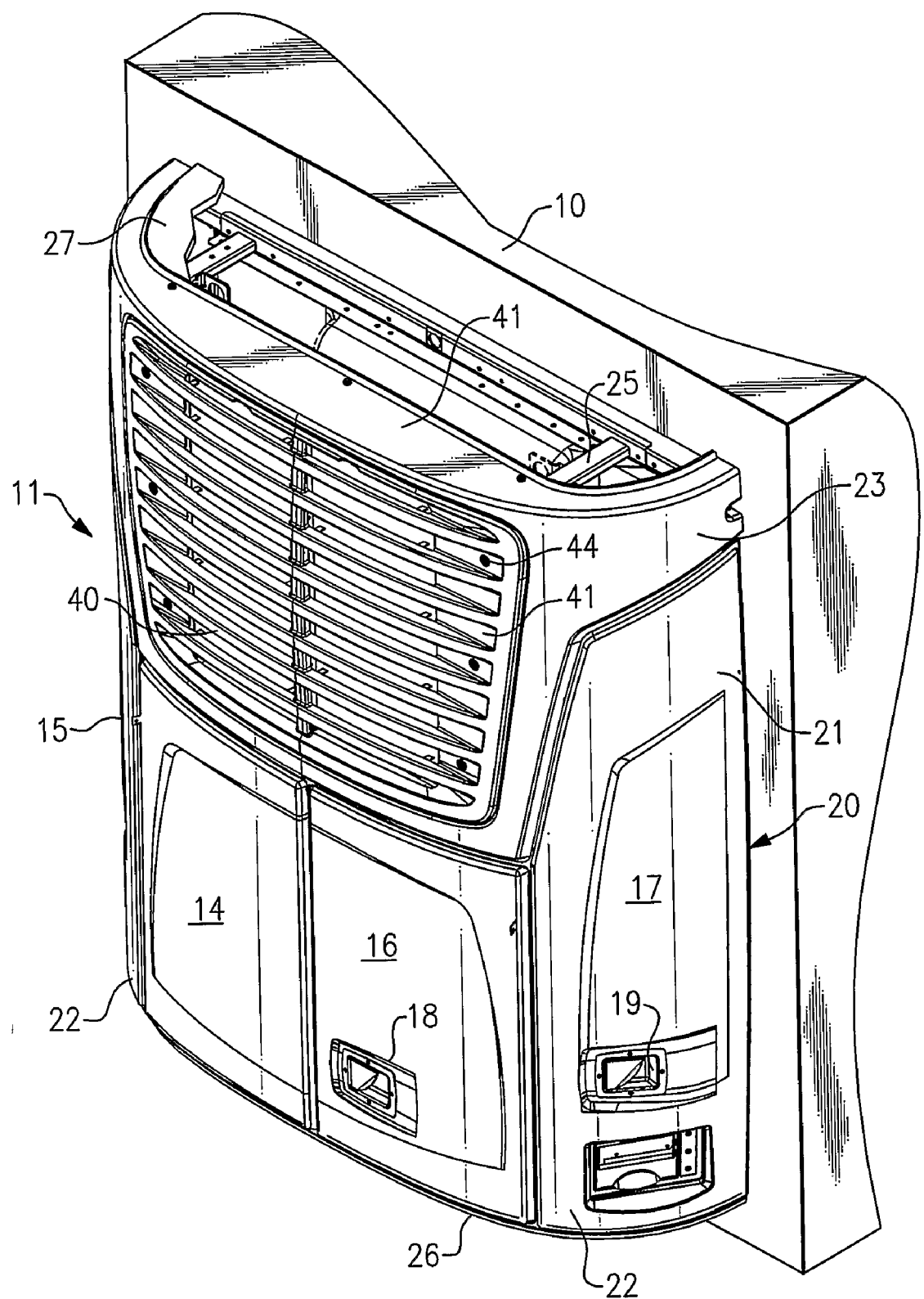
FIG. 1 is a perspective view of a transport refrigeration unit having a cover having the present invention incorporated therein.

Referring now to FIG. 1, a fragmentary front part of a large transport trailer 10 is shown with a transport refrigeration unit 11 mounted on the front wall of the trailer. For purposes of the present description the terms "roadside" and "curbside" will be used in describing various components of the refrigeration unit and its cover. As viewed in FIG. 1, the right hand side of the unit will be referred to as the roadside and the left hand side of the unit as the curbside of the unit.

With this reference, the transport refrigeration unit 11 as illustrated in FIG. 1 has a cover assembly 20 having a lower cover assembly 21 and an upper cover assembly 23. The lower cover assembly 21 includes a curbside front door 14, a curbside outer door 15, a roadside front door 16, a roadside outer door 17, all shown in their closed positions, side panels 22 and bottom panel 26. The front doors 14 and 16 are vertically hinged at their respective outer edges so as to swing outwardly to open to provide a large access opening at the front of the unit, thereby providing access to the inner structural components of the unit as well as some of the components of the refrigeration system itself. The outer doors 15 and 17 are mounted within the respective side panels 22 and vertically hinged at their respective rear edges such that they pivot open from front to back to provide additional access openings to the interior of the refrigeration unit at the sides of the unit. Latches 18 and 19 are provided for latching and unlatching the front roadside door 16 and side roadside door 17, respectively. The bottom panel 26 is attached to the lower cover assembly for purposes of closure and to improve the aesthetics of the unit.

Attachment of the refrigeration unit 11 to the trailer 10 is carried out by connection of an outer peripheral planar structural steel framework designated generally by reference numeral 25. It should be appreciated that this framework is not normally visible when the unit is properly installed on a trailer unit, however for purposes of illustration, at least a portion of the structural framework is illustrated in FIG. 1. All of the component assemblies which define the outer cover of the refrigeration unit 11 are mounted to the various structural members of the framework 25.

The upper cover assembly 23 comprises a relatively rigid front grille member 40 and a relatively flexible support structure 42, also referred to herein as the surround assembly, disposed in surrounding relationship therewith. The grille member 40 is positioned in overlying relationship with a center opening 67 in the surround assembly 42 and the condenser heat exchanger therebehind (not shown). The grille is provided with a large number of openings 41 therethrough to facilitate air flow for efficient heat transfer to cool the condenser coil of the refrigeration unit. A top panel 27 may be attached to the upper cover assembly of the unit for purposes of closure and to improve the aesthetics of the unit. It will be appreciated that the door, panel, surround assembly and grille components described above are designed to cooperate to fully enclose the refrigeration unit 11 to provide protection from the environment and road hazards and to aerodynamically and aesthetically enhance the unit.

Figure 2:
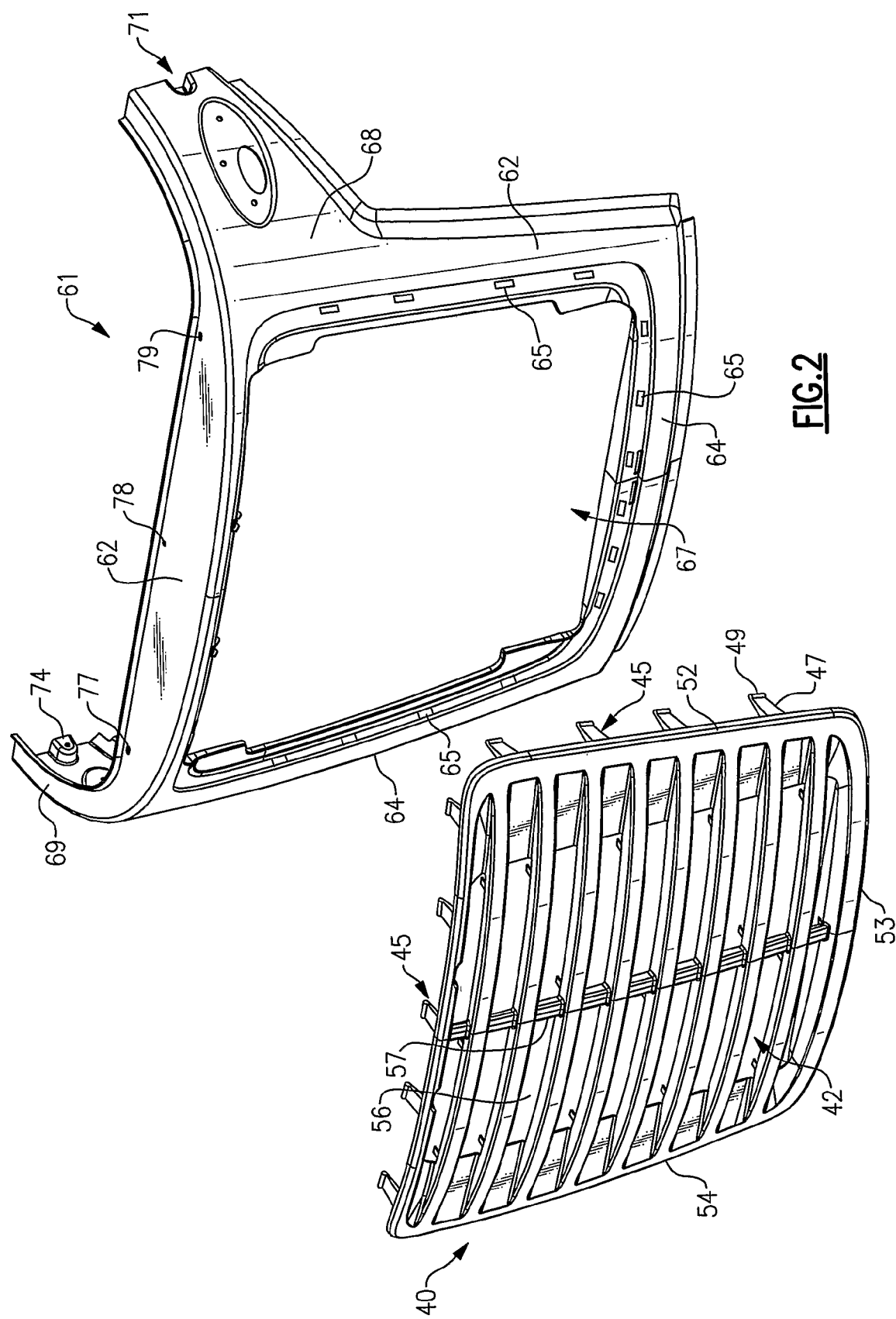
FIG. 2 is an exploded view of the surround support assembly and the grille in accordance with the present invention.
Figure 3:
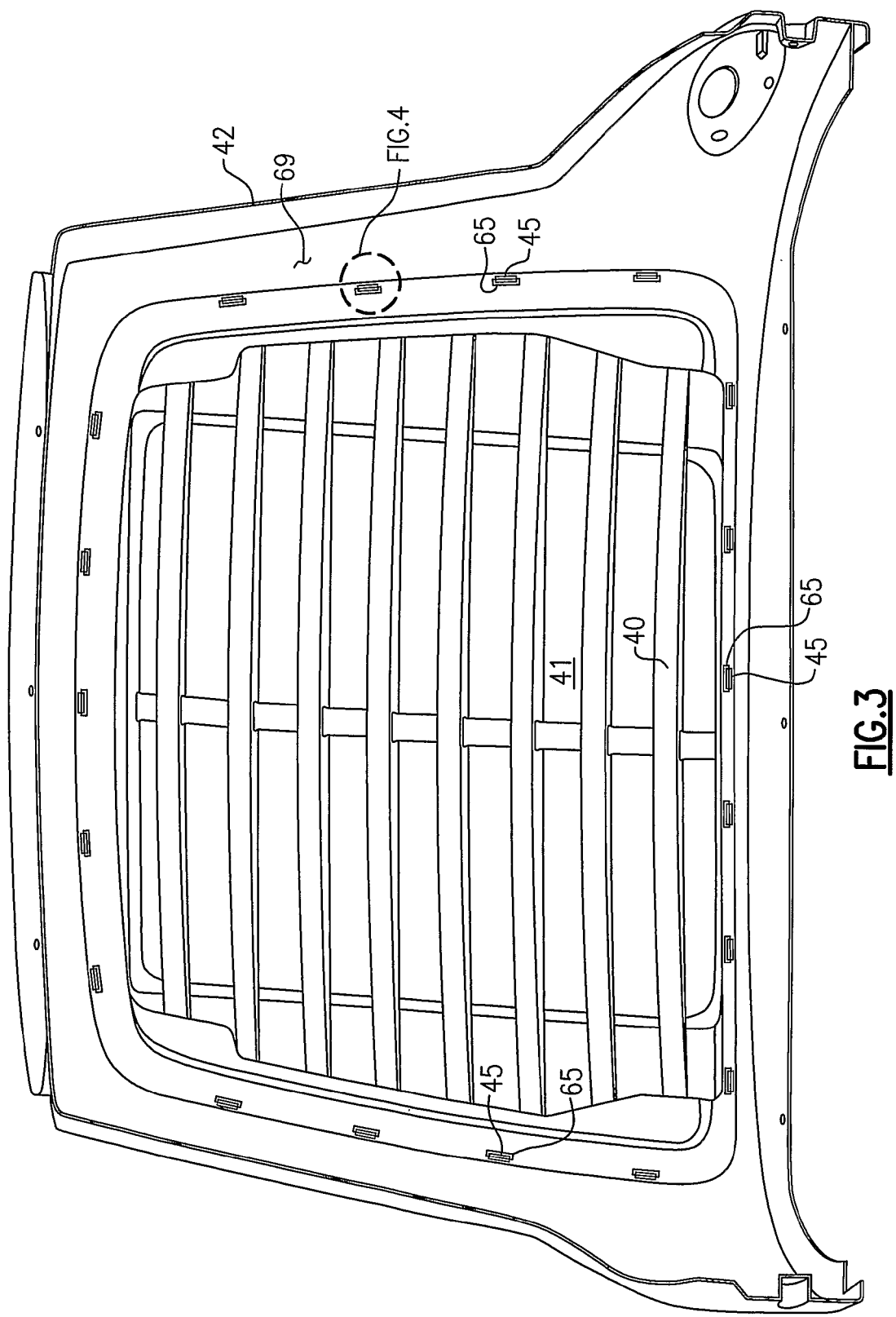
FIG. 3 is a perspective view of the backside of the grille as attached to the surround structure.
Figure 4:
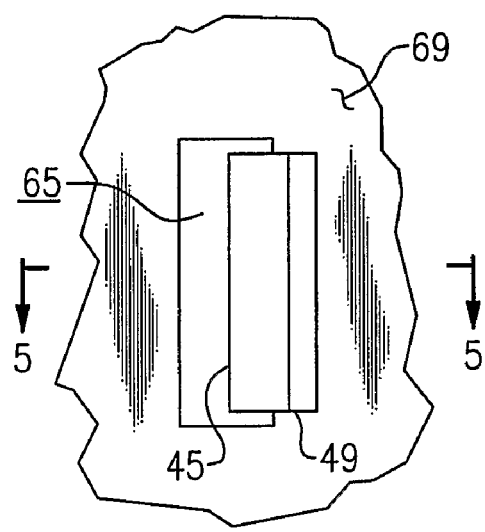
FIG. 4 is an exploded view of the distal end of latch member in latching relationship with the surround assembly.
Figure 5:
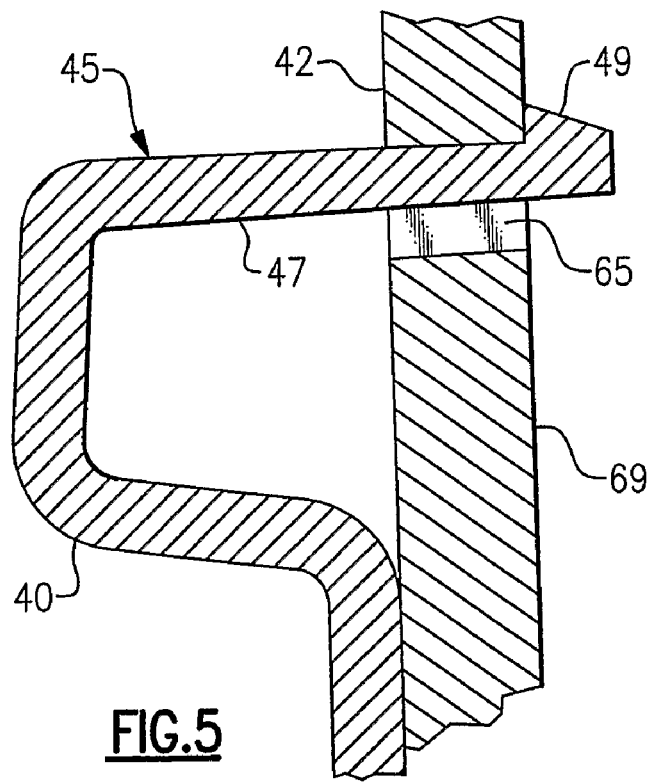
FIG. 5 is a sectioned elevation view taken along line 5-5 of FIG. 4.

Referring now to FIGS. 2-3, the front grille member 40 is shown as generally rectangular in shape having sides 51, 52, 53 and 54. It is slightly curved from front to back so as to wrap around the front face as shown. It has a plurality of horizontally disposed, and vertically spaced, louver members 56, in combination with vertically disposed spacer members 57 therebetween, to define in combination the plurality of openings 41 for the flow of air for cooling the condenser coil (not shown). Surrounding the grille member 40 is the surround assembly 42 which has a side 61 bordering the grille side 51, a side 62 bordering grille side 52, a side 63 bordering the grille side 53, and a side 64 bordering grille side 54. The sides 61, 62, 63 and 64 cooperatively form a periphery about and define the rectangular shaped, center opening 67 in the surround assembly 42 for accommodating the attachment of the grill member 40 and the flow of air therethrough. In an embodiment, the sides 61, 62, 63 and 64 are all integrally formed in a single piece. Both the top 62 and the bottom 64 have rounded edges and extend rearwardly. The sides 63 and 66 also have rounded front edges and extend rearwardly in a curved manner, but also have rearwardly extending wing structures 68 and 69, respectively.

The surround assembly 42 is secured to the structural framework 25, typically by bolts or other threaded fasteners. In the exemplary embodiment depicted, the wing structures 68 and 69 of the surround assembly 42 have respective indentions 71 with surfaces 74 for the receiving of threaded fasteners (not shown) therethrough for the purpose of securing the wing structures 68 and 69 to the appropriate structural members of the framework 25. In the side 61 of the surround assembly 42 a plurality of holes 78 are formed near the rear edge thereof for securing the side 61 to the structural framework 25. Similarly, attached to and extending rearwardly from the bottom 63 of the surround assembly 42 is a flange having holes (not shown) formed therein for receiving fasteners for attaching the flange with a cooperating structural member of the framework 25.

Referring now to FIGS. 2-5, the front grille member 40 is attached to the surround assembly 42 by a plurality of latch members 45 received in respective mating openings of a corresponding plurality of openings 65 in the surround assembly 42. The latch members 45 are disposed at spaced intervals about the periphery of the grille 40 and extend rearward from the sides 51, 52, 53 and 54 of the grille 40. The corresponding plurality of openings 65 are disposed at spaced intervals about the periphery of the center opening 67 in the surround assembly 42 and are arranged in the sides 61, 62, 63 and 64 of the surround assembly 42 such that each opening 65 is positioned to receive a corresponding latch member 45 when the front grille member 40 overlays the center opening 67 in the surround assembly 42.

Each of the latch members has a leg 47 extending rearward from the periphery of the grille 40. Each leg has a proximal end integral with the grille 40 and a distal end having a foot 49 extending laterally therefrom. When the front grille member 40 is assembled to the surround assembly 42, the distal end of the leg 47 of each latch member 45 extends through its corresponding opening 65 such that the foot 49 overlaps the rearward surface 69 of the surround assembly 42, thereby securing the latch members 45 within the openings 65 in latching relationship with the surround assembly and holding the grille 40 in position in overlaying relationship with the center opening 67 of the surround assembly 42.

In the embodiment of the transport refrigeration unit of the invention depicted in the drawing, the grille 40 is attached to the surround assembly 42 of the cover by means of latch members 45, the legs 47 of which may be simply inserted into the corresponding openings 65 in the periphery of the support assembly 42 until the foot 49 of each latch member 45 snaps into latching relationship with the surround assembly 42. The plurality of latch members disposed at spaced intervals encompassing the entire periphery of the grille enhances the structural rigidity of the upper cover assembly formed of the grille 40 and the surround assembly 42 to which it is attached and provides for more uniform distribution of vibration-induced stresses across multiple compliant attachment points. Additionally, no tools are required to assemble the grille 40 to the surround assembly 42. However, it is to be understood that, if desired, additional mechanical fasteners, for example threaded fasteners, can be installed after the grille 40 has been snapped in place to the surround assembly 42 to further secure the grille 40 to the surround assembly 42.

While the present invention has been particularly shown and described with reference to the exemplary embodiment as illustrated in the drawing, it will be understood by one skilled in the art that various changes in detail may be effected therein without departing from the spirit and scope of the invention as defined by the claims.

We claim:

1. A transport refrigeration unit of the type adapted to be mounted on the front wall of a trailer for conditioning the environment interior of the trailer, the unit having a structural framework which includes structural members to be attached to the trailer for supporting the unit from the trailer and a front cover for enclosing the refrigeration unit, the front cover comprising:

a grille having a plurality of air flow openings formed therein for conducting the flow of air therethrough, said grille assembly having a periphery and a plurality of latch members extending rearward from said periphery; and a support structure attached to and supported by the frame, said support structure having a center opening defined by a plurality of peripheral sides and adapted to receive said grille in overlaying relationship and a plurality of openings in the peripheral sides for receiving said latch members in latching relationship, wherein each of said latch members comprises a leg extending rearward from said grille, said leg having a proximal end integral with said grille and a distal end extending through a respective one of said plurality of openings in the peripheral sides of said support structure, said leg having a foot at its distal end, said foot extending outwardly so as to engage said support structure in latching relationship.

2. A transport refrigeration unit as recited in claim 1 further characterized in that said latch members are disposed at spaced intervals about the periphery of said grille and said plurality of openings in the peripheral sides of said support structure are commensurate in number to the plurality of said latch members and arranged in mating relationship to said plurality of latch members.

3. A transport refrigeration unit as recited in claim 1 further characterized in that said grille has a periphery having four sides with said latch members extending rearward from each side of said four sides.

4. In a transport refrigeration unit of the type adapted to be mounted on the front wall of a trailer for conditioning the environment interior of the trailer, the unit having a structural framework which includes structural members adapted to be attached to the trailer for supporting the unit from the trailer, and a front cover for enclosing the refrigeration unit having a support structure mounted to the structural framework and a grille attached to the support structure in overlaying relationship to a center opening defined by peripheral sides of the support structure, a method for attaching the grille to the support structure comprising:

attaching the grille to the support structure with latch members, wherein each of said latch members comprises a leg extending rearward from said grille, said leg having a proximal end integral with said grille and a distal end extending through a respective one of a plurality of openings in the peripheral sides of said support structure, said leg having a foot at its distal end, said foot extending outwardly so as to engage said support structure in latching relationship.

5. A method as recited in claim 4 further comprising:

providing the plurality of openings in the support structure about the periphery of the center opening at spaced intervals, wherein said plurality of openings in the peripheral sides of said support structure are commensurate in number to the plurality of said latch members and arranged in mating relationship to said plurality of latch members, and wherein each of said plurality of openings is adapted for receiving one of said latch members in latching relationship.

* * * * *